(12) United States Patent
Gurin

(10) Patent No.: US 7,261,094 B2
(45) Date of Patent: Aug. 28, 2007

(54) INJECTION UNIT FOR AN INTERNAL COMBUSTION ENGINE

(75) Inventor: Viktor Gurin, Nowouralsk (RU)

(73) Assignee: Thomas Weiher, Bremerhaven (DE)

( * ) Notice: Subject to any disclaimer, the term of this patent is extended or adjusted under 35 U.S.C. 154(b) by 0 days.

(21) Appl. No.: 10/543,259

(22) PCT Filed: Jan. 16, 2004

(86) PCT No.: PCT/EP2004/000304

§ 371 (c)(1),
(2), (4) Date: May 26, 2006

(87) PCT Pub. No.: WO2004/065779

PCT Pub. Date: Aug. 5, 2004

(65) Prior Publication Data

US 2006/0272620 A1   Dec. 7, 2006

(30) Foreign Application Priority Data

Jan. 23, 2003 (DE) .................... 103 02 729

(51) Int. Cl.
*F02M 23/00* (2006.01)
*F23B 1/00* (2006.01)

(52) U.S. Cl. ............................ 123/531; 431/2

(58) Field of Classification Search ............... 123/531, 123/540; 431/2, 4, 8, 10
See application file for complete search history.

(56) References Cited

U.S. PATENT DOCUMENTS

| 4,086,877 A * | 5/1978 | Henkel et al. ............... 123/1 A |
| 4,443,180 A * | 4/1984 | LeFrois .......................... 431/4 |
| 5,564,402 A * | 10/1996 | Poschl ......................... 123/590 |
| 5,884,611 A * | 3/1999 | Tarr et al. .................... 123/531 |
| 6,348,178 B1 * | 2/2002 | Sudduth et al. ............. 423/235 |
| 6,682,709 B2 * | 1/2004 | Sudduth et al. ............. 423/235 |
| 7,100,542 B2 * | 9/2006 | Ehresman ....................... 123/3 |
| 2006/0134569 A1 * | 6/2006 | Coombe ....................... 431/12 |

* cited by examiner

*Primary Examiner*—John T. Kwon
(74) *Attorney, Agent, or Firm*—Akerman Senterfitt; Stephan A. Pendorf; Yonghong Chen

(57) ABSTRACT

The invention relates to a process for the injection of fuel into an internal combustion engine, wherein the fuel is firstly enriched in a gas enrichment device (20) with a gas or a gas mixture, in particular oxygen or air. The fuel is atomized and the gas or gas mixture dissolved into the atomized fuel and the enriched fuel is then injected directly into at least one cylinder (12), or indirectly into a preceding region (17), in particular the intake manifold of the engine, with the result of further atomization. The fuel, at least in the enriched state, is cooled up until the final atomization such as to counteract a release of the gas or gas mixture from the fuel before said final atomization. The invention further relates to an injection unit for carrying out said process.

17 Claims, 1 Drawing Sheet

INJECTION UNIT FOR AN INTERNAL COMBUSTION ENGINE

This application is a national stage of PCT/EP2004/000304 filed Jan. 16, 2004 and based upon DE 103 02 729.7 filed Jan. 23, 2003 under the International Convention.

BACKGROUND OF THE INVENTION

1. Field of the Invention

The present invention concerns a process for injecting fuel into an internal combustion engine, wherein the fuel is first enriched with a gas or gas mixture, preferably with oxygen or air, in a gas enrichment device, in that the fuel is atomized and the gas or gas-mixture is supplied to the atomized fuel; whereupon subsequently the enriched fuel is injected directly into a cylinder or indirectly into an area preceding the cylinder, more particularly the intake manifold of the engine, with the result of a final atomization.

The present invention concerns beyond this an injection device for an internal combustion engine for carrying out the above process, comprising a gas enrichment device, which includes a space for enriching fuel with a gas or a gas mixture, in particular oxygen or air, and further includes at least one atomization means as well as at least one opening for a gas inlet, at least one pump means for supply of the fuel and for supply of the gas or gas-mixture in the enrichment space, and a supply line or inlet for introduction of the enriched fuel from the gas enrichment device to a final atomization means, wherein the final atomization means is provided for the subsequent direct or indirect injection of the enriched fuel into a cylinder or into an area preceding a cylinder, in particular an intake manifold.

2. Related Art of the Invention

In a process of this type, in which the fuel, which in the manner of a conventional direct or indirect injection is atomized as fine as possible using a nozzle directly prior to combustion, in order to guarantee formation of an optimal mixture with the air supplied into the combustion chamber or prior thereto, is prior to this final atomization already once atomized and at this time enriched with a gas such as oxygen.

If this enriched fuel is injected in a conventional manner for example into the intake manifold or directly into the cylinder of an engine, that means, is again atomized, then the gas contained or dissolved in the fuel leaves and causes, by this "degassing", in comparison to the atomization of unenriched fuel, and improved disruption or as the case may be atomization of the micro- and macro-fuel droplets, and likewise causes a more homogenous mixing of the fuel with the supplementally supplied air.

It is known that as the fuel droplets become smaller, inhomogeneities of the air/fuel mixture become increasinly reduced. By the previous enriching of the fuel with a gas in the course of an atomization, then during the actual injection process the effect of the subsequent final atomization is increased due to the degassing occurring thereby. As a result of this described injection process, due to, among other things, the reduction of inhomogeneities in the combustion mixture, an improved combustion is achieved and therewith the fuel consumption is reduced.

It is a primary goal in engine development to achieve further reductions in consumption. It is thus a task of the present invention to so further improve the above described injection process and the above described injection system in such a manner that further savings potential in fuel consumption can be realized.

SUMMARY OF THE INVENTION

In accordance with the invention the fuel is cooled, at least while in the enriched state, until the final atomization, such that a release of the gas or gas-mixture from the fuel prior to the final atomization, that is, a premature degassing, is counteracted. It is thus accomplished that the greatest part of the dissolved gas/gas mixture remains in the fuel and is only released at the final atomization.

The fuel consumption can thereby be reduced, depending upon the type of engine, when provided with the inventive injection system, by up to 25% in comparison to the basic version of the engine, that is, in comparison to the same engine but without the inventive injection process. At the same time the carbon monoxide production is reduced by up to 5.6%.

It has been found empirically that it is particularly advantageous when the temperature of the enriched fuel during injection is 1 to 10° C., preferably 1 to 3° C.

The same ranges, that is 1 to 10° C., preferably 1 to 3° C., applies also for the temperature which the enriched fuel should have in the entire sequence, that is, in the gas enrichment device and along the path from this gas enrichment device until the final atomization.

The second, final atomization occurs in particularly effective manner when the gas pressure at enrichment of the fuel at the first atomization is higher than the air pressure in the prestaged or preliminary area or, as the case may be, in the cylinder during the final injection process, that is, at the second atomization. The reason is that this leads to a particularly effective release of the gas from the solution in the elementary fuel volume.

As already discussed above, the micro and macro droplets of the fuel are supplementally further broken up beyond the conventional nozzle jet atomization, since the fuel is further dispersed by the release of the excess dissolved gas. By the enormous breaking up of the fuel particles or, as the case may be, fuel droplets, the degree of homogenization of the fuel-air mixture increases in the cylinder (direct injection) or, as the case may be, in the prestaged area (indirection injection), for example in the intake manifold.

Thereby there results an even and rapid and complete fuel combustion in the entire combustion chamber volume in comparison to the conventional engine without the inventive injection system, that is, with the standard injection process or as the case may be standard injection system. If the gas or gas-mixture is oxygen or air, then the released oxygen contributes, in addition to the air supplied in conventional manner, to the combustion aspect or, as the case may be, becomes a component of the fuel-air mixture in the cylinder or in the prestaged area.

It has been discovered that advantageously the gas pressure during enrichment of the fuel during the first atomization should be 1.2 to 50 times as high as the air pressure in the prestaged area or, as the case may be, in the cylinder at the final injection process.

The inventive task is solved by an injection system for an internal combustion engine for carrying out the above described process.

In accordance therewith a cooling system is provided in such a manner that at least the enriched fuel remains cooled up until the final atomization in the final atomization means, so that a release of the gas/gas mixture out of the fuel prior to this final atomized is counteracted.

The cooling system of the injection system can be so designed that it cools both the enriched fuel as well as the entire gas enrichment device and the supply line. Thereby the degassing of the fuel is extremely effectively counteracted.

Further characteristics of the present invention can be seen from the appended dependent claims as well as from the description of the concrete embodiments as well as from the drawing of an illustrative embodiment.

BRIEF DESCRIPTION OF THE DRAWING

Therein there is shown.

DETAILED DESCRIPTION OF THE INVENTION

Figure 1:
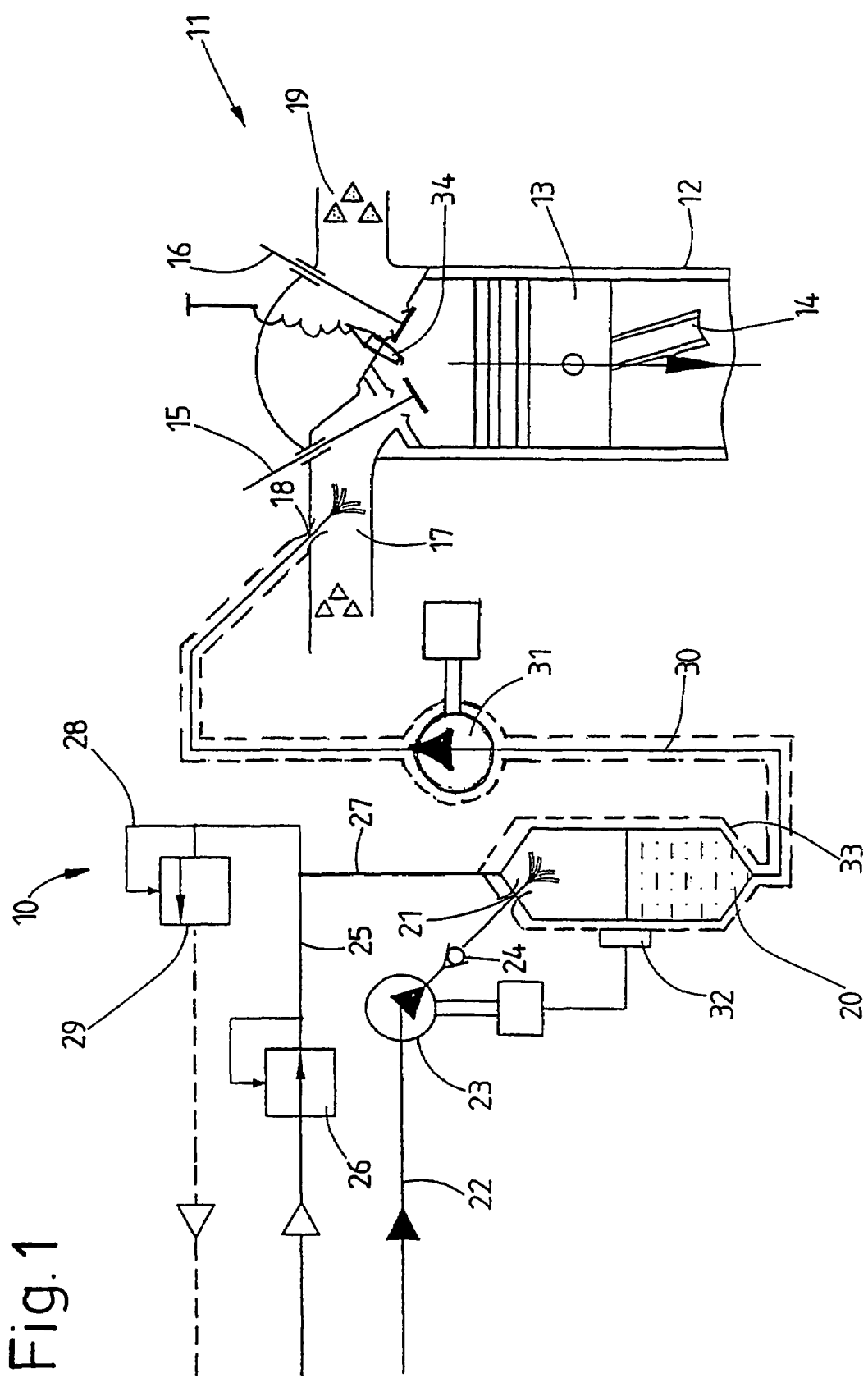
FIG. 1 a basic diagram of an inventive injection system.

In the left area of FIG. 1 an injection system 10 is shown, which in accordance with the invention supplies fuel, for example diesel or gasoline, depending upon the type of engine, to an internal combustion engine 11. The combustion area 11 is therein comprised of a cylinder 12, in which a piston 13 is moved up and down via a piston rod 14. An intake valve 15 and an exhaust valve 16 control, in the manner well known in the state of the art, the introduction of a fuel/air mixture and the exhausting thereof after combustion.

Air to be used in the formation of the fuel/air mixture is introduced in intake manifold 17. In this collection part 17 fuel is injected under high pressure together with air or gas via nozzle 18. The pressure employed in the nozzle need not be described in greater detail herein, since it is well known to the person of ordinary skill.

The fuel/air mixture ignited by spark plug 34 and subsequently combusted in the cylinder 12 is exhausted from the engine compartment along exhaust line 19.

The injection system 10 includes a gas enrichment device with a gas- and liquid-tight, closed chamber 20, in which fuel is injected via injection atomization nozzle 21. This fuel comes from a not shown tank, from which the fuel is supplied to the nozzle 21 via a supply line 22, a high pressure pump 23 and a one-way valve 24. At the same time oxygen or air is introduced under pressure into the chamber 20 via a supply line 25, a not shown high pressure compressor, and a pressure controller 26.

A line 27, which transitions to the supply line 25, is designed to be dual purpose, that is, it serves at the same time for the supply of gas and air, as well also as return line or exhaust line for excess gas in the chamber. This excess gas is supplied via exhaust line 28 and the safety valve 29 to the not shown fuel tank.

Between the chamber 20 and the injection nozzle 18 a supply line 30 is provided which supplies the oxygen enriched fuel from chamber 20 to the injection nozzle 18. Further, an injection pump 31 is provided at the supply line 30, in order to convey the enriched fuel under pressure.

Finally, the injection system includes a level indicator 32, which senses the fuel level in the chamber 20.

Both the chamber 20 as well as the supply line 30 are cooled by the cooling system 33, which surrounds these elements and is indicated by dashed lines.

In the following the manner of operation of the injection system 10, and therewith also the underlying process, are described and explained in greater detail:

It is important relative to the process of the present invention that the fuel, prior to being injected into the collection line 17 via the injection nozzle 18, is atomized before being enriched with gas, here oxygen or air, in order to optimize the subsequent, final atomization process, which occurs in conventional manner immediately prior to combustion. This enriching with air or oxygen (for simplicity in the following reference is only made to oxygen) occurs in the chamber 20:

Fuel is supplied via high pressure pump 23 (high pressure compressor) to the nozzle 21, in which it is atomized and mixed with oxygen flowing via supply lines 25, 27, likewise under high pressure, preferably 10 MPa. The high pressure pump 23 includes in particular a pressure gradient of 2.5 MPa.

The condition should therein be selected to be such that the self- or auto-ignition of the fuel is prevented. The gas pressure in the chamber is kept at a controlled pressure in the chamber with the aid of the pressure controller 23 and the safety valve 29, which pressure is at least 1.2 times higher than the air pressure in the intake manifold 17.

The enriched fuel collects in liquid form at the basin of the chamber 20. By means of the level indicator and a suitable control it is ensured that the fuel amount in the chamber 20 is always in the desired level, independent of the respective instantaneous rate of consumption by the engine. This can occur thereby, that the fuel atomization and the gas supply are activated or, as the case may be, interrupted, by turning on or off of the appropriate pumps. Of course, a variety of other possible solutions are conceivable.

The thus enriched fuel is supplied to nozzle 18 for final atomization, and namely via supply line 30, wherein high pressure pump 31 is supplementally provided for conveyance and for achievement of the necessary injection pressure. By means of this nozzle 18 an optimal atomization, that is, breaking up of the micro and macro droplets of the enriched fuel is achieved, since the oxygen dissolved in the fuel is released from the enriched fuel and during release ensures a supplemental atomization of the fuel droplets.

The atomized fuel then mixes with the air entering via the intake collection line 17 to form a combustible fuel/air mixture. This mixture is introduced via the intake valve 15 into the combustion chamber of the cylinder 12, which is bordered from below by the piston 13, and is combusted. The burned mixture is exhausted via exhaust valve 16 into exhaust line 19 and is conveyed away.

It is particularly important, when an improved enrichment of the oxygen in the fuel is achieved by the cooling of the chamber 20 and the supply line 30, to prevent a premature degassing of the fuel, that is, to prevent a release of the oxygen prior to the final atomization. As a result of the cooling, which maintains the enriched fuel preferably at a temperature of 1 to 3° C., degassing then occurs almost completely first at the injection process, namely during atomization by means of nozzle 18. By the cooling of the enriched fuel there result yet further effects, which positively influence the fuel consumption.

Test drives with a series production model "Ford Mondeo" with the two liter gas motor "Zetek", which was equipped with the above described injection system, showed the following results:

After a run time of 125,000 km with a use load of 180-300 kg, in comparison to the same model, the following increase in economy was achieved (the vehicle test was carried out on a diagnostic test stand AP500 112 K4000):

In the cold condition the engine efficiency increased by 18.6% with a reduction of carbon monoxide content of 5.6%. In the warm condition these values became 14.8% or, as the case may be, 6.5%.

It must be noted that it is naturally within the framework of the invention to equip various engine types with the inventive injection system or, as the case may be, the injection process. Thus there could be employed, among others, diesel as well as gasoline engines, with one or more cylinders, with direct or indirect injection, and with diverse supplemental control processes for injection.

REFERENCE NUMBER LIST

10 Injection system
11 Combustion area
12 Cylinder
13 Piston
14 Piston rod
15 Intake valve
16 Exhaust valve
17 Intake manifold
18 Nozzle
19 Exhaust line
20 Chamber
21 Nozzle
22 Supply line
23 High pressure pump
24 One way valve
25 Supply line
26 Pressure controller
27 Supply and exhaust line
28 Exhaust line
29 Safety valve
30 Supply line
31 Injection pump
32 Level indicator
33 Cooling
34 Spark plug

The invention claimed is:

1. A process for injecting fuel into an internal combustion engine, with the following process steps:
enriching the fuel in a gas enrichment device (20) with a gas or a gas mixture, by atomizing the fuel and then supplying the gas or gas mixture to the atomized fuel, subsequently injecting the enriched fuel directly into at least one cylinder (12) or indirectly into a prestaging area (17) of the engine with the result of a subsequent atomization, wherein the fuel is cooled at least in the enriched condition up until the final atomization, so that release of the gas or gas mixture from the fuel prior to the final atomization thereof is counteracted.

2. The process according to claim 1, wherein the temperature of the enriched fuel reaching the final atomization is 1 to 10° C.

3. The process according to claim 2, wherein the temperature is 1 to 3° C.

4. The process according to claim 1, wherein the temperature of the enriched fuel from the gas enrichment device up until the final atomization is 1 in 10° C.

5. The process according to claim 4, wherein the temperature of the enriched fuel from the gas enrichment device up until the final atomization is 1 to 3° C.

6. The process according to claim 1, wherein the gas pressure of the gas or gas mixture, upon reaching the fuel, is higher than the air pressure in the prestage area or, in the cylinder during the final atomization process.

7. The process according to claim 6, wherein the gas pressure is 1.2-50 times as high as the air pressure in the prestage area or in the cylinder during the final injection process.

8. The process according to claim 1, wherein the gas or a gas mixture is oxygen.

9. The process according to claim 1, wherein the gas or a gas mixture is air.

10. An injection system for an internal combustion engine for carrying out a process in which fuel is first enriched in a gas enrichment device (20) with a gas or a gas mixture, by atomizing the fuel and supplying the gas or gas mixture to the atomized fuel, subsequently injecting the enriched fuel directly into at least one cylinder (12) or indirectly into a prestaging area (17) of the engine with the result of a subsequent atomization, wherein the fuel is cooled at least in the enriched condition up until the final atomization, so that release of the gas or gas mixture from the fuel prior to the final atomization thereof is counteracted, said device comprising:
a gas enrichment device for enriching fuel with a gas or a gas mixture, wherein the gas enrichment device includes an enrichment chamber (20) for enrichment of fuel with a gas or a gas mixture and at least one atomization means (21), as well as at least one opening for a gas inlet in the enrichment chamber,
at least one pump means for supplying the fuel and for supplying the gas or gas mixture into the enrichment chamber,
a supply line (30) fat conveying the enriched fuel from the enrichment chamber (20) to a final atomization means (18),
wherein the final atomization means (18) is provided for the subsequent direct or indirect injection of the enriched fuel into a cylinder (12) or an intake manifold (17), and
wherein a cooling system (33) is provided such that at least the enriched fuel is cooled up until the final atomization in the terminal atomization means (18), so that a release of the gas or gas mixture out of the fuel is counteracted prior to the final atomization.

11. The injection system according to claim 10, wherein the cooling system (33) is configured such that at least the enrichment chamber (20) is cooled.

12. The injection system according to claim 10, wherein the enrichment space (20) is a closed chamber (20), which includes at least one inlet, via which the gas or gas mixture is suppliable, and at least one nozzle (21), via which the fuel is injectable into the chamber (20).

13. The injection system according to claim 12, wherein pump means (23) and pressure regulating means (26) are provided, so that the gas or gas mixture and/or the fuel is introduced into the chamber (20) under a controlled pressure and so that the pressure in the chamber is maintained at a controlled pressure.

14. The injection system according to claim 12, wherein a level indicator (32) is provided; which senses the amount of the enriched fuel in the chamber.

15. The injection system according to claim 12, wherein the fuel is injectable, with atomization, into the chamber (20).

16. The injection system according to claim 10, wherein the cooling system (33) is configured such that in addition to the enrichment chamber (20) the supply line (30) also is cooled.

17. The injection system according to claim 10, wherein the gas or a gas mixture is oxygen or air.

* * * * *